May 25, 1926.
W. A. CRAWFORD-FROST
1,586,028
AUTOMOBILE BUMPER
Filed Oct. 10, 1925
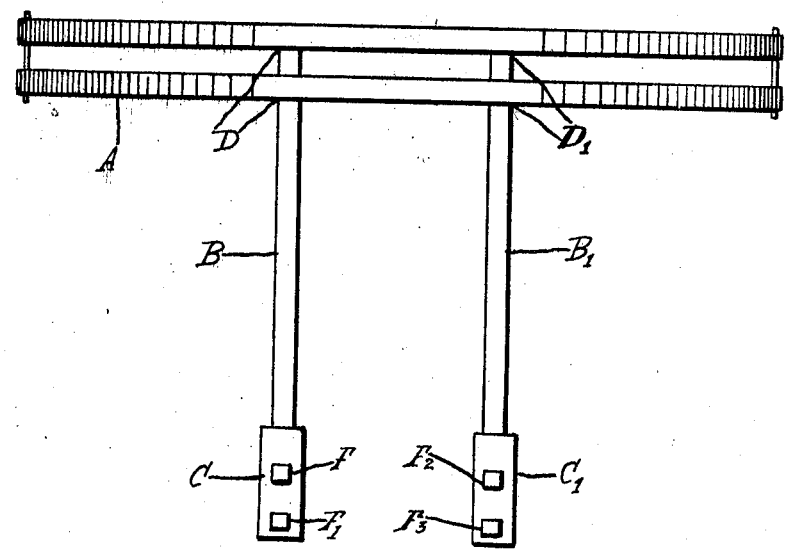
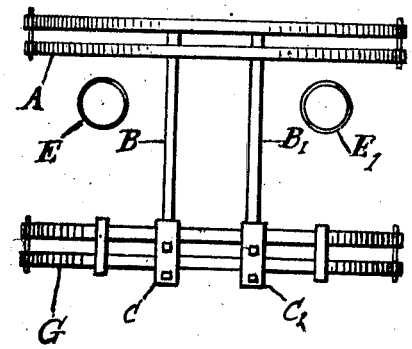
William A. Crawford-Frost
INVENTOR.

Patented May 25, 1926.

1,586,028

UNITED STATES PATENT OFFICE.

WILLIAM ALBERT CRAWFORD-FROST, OF BALTIMORE, MARYLAND.

AUTOMOBILE BUMPER.

Application filed October 10, 1925. Serial No. 61,739.

My invention relates to automobile bumpers and consists in an elevated device to be attached to automobile bumpers such as are now in common use, or, by uprights to some part of the car lower than the headlights.

The objects of this invention are to minimize the shock to a pedestrian when he is struck by an automobile and to prevent him from being thrown backwards against the car, or under it; and to afford additional protection to the lamps and radiator of an automobile, or other parts that cannot be protected by low bumpers.

These and other objects are accomplished chiefly by having a horizontal bumper supported by spring uprights, preferably of flat steel, which rest upon and are attached to the bumpers now in use for the protection of the car only. At present the bumpers in use are usually so low that they strike a pedestrian on the legs and throw him back against the rigid radiator, or lamps, or the end of a fender and he thus suffers the impact of the weight and momentum of the car. By my device the elevated horizontal bumper, striking him higher on the body, prevents his being thrown back against the car. If the pedestrian is standing directly in front of the middle of the car, the shock is minimized chiefly by the yielding of the upright springs, but this would seldom happen as the driver generally has time to turn the car a little to either side. Most frequently the pedestrian, therefore, when this device is used, will be struck by an outer side of the elevated horizontal bumper, and the shock will be minimized, not only by the yielding of the upright springs but by the yielding of the outer side of the elevated horizontal bumper as well, which will tend to throw him not only forwards but off to one side and clear of the car altogether. While this will subject him to the danger of hitting the ground it will prove to be much less serious than receiving the full impact of a rigidly attached part of the car and then hitting the ground with the chance of being run over by the wheels as well.

The protection afforded by the device to the lamps and radiator is obvious from a glance at the position it occupies higher than and in front of the lamps and in front of the radiator. It often happens that, with closely parked cars, or where vehicular traffic is congested, the lamps, or radiators, or fenders are struck by the projecting part of a vehicle in spite of the bumpers now in use. In such cases the elevated horizontal bumper attachment will afford valuable protection.

Referring to the accompanying drawings:

Similar parts are indicated by the same letters throughout.

Figure 1 is a front elevation of the device, showing the elevated horizontal bumper, uprights and clamps.

Figure 2 is a front elevation of the device clamped to an ordinary bumper and showing approximately the position of the uprights and elevated bumper in relation to the lamps of an automobile.

Figure 3 is a side elevation of one of the clamps.

Referring to Figure 1: A shows an elevated horizontal bumper composed in this case of two flat pieces of nickel-plated steel connected together by a rod at each end and also by being welded or clamped or bolted to the upright supports B, $B_1$ at the location of D, $D_1$. B and $B_1$ are composed of nickel-plated flat steel pieces and terminate below in the clamps C and $C_1$ which show square-headed bolts F, $F_1$, $F_2$, $F_3$.

Referring to Figure 2 we seen the horizontal bumper of my device attached to the ordinary bumper of an automobile by the clamps C and $C_1$ in which the bolts F, $F_1$, $F_2$, $F_3$ pass between or under the members of the bumper G thus holding the device securely. The uprights B and $B_1$ are shown between the lamps E and $E_1$ while the elevated horizontal bumper A is above them.

It should be understood that while your petitioner prefers this construction and arrangement of parts, he does not feel bound to limit himself to them. The elevated horizontal bumper may be single, double, triple, or consist of any number of members. It may be of steel, wood, upholstered leather, woven wire, or any suitable material. The uprights may be nearer together or further apart, longer or shorter, narrower or wider, and may be of any desired number. They may be braced and of any shape so long as they support the elevated horizontal bumper. The clamps may be of any suitable design according to the kind of bumper already on the car, round or flat, or the uprights may be welded to the lower bumper. The device may occupy any relation of position as concerns the lamps so long as it is in front of them and does not obstruct the light from the lamps. The drawings merely show the nature and purpose of the device and one preferred form of it.

The device being of so simple a character it does not appear that a further description of details is necessary, the purposes being easily understood and the means by which they are accomplished being equally obvious.

Having, therefore, fully described his invention, what your petitioner desires to claim as new, and for which he prays that Letters Patent be granted to him are as follows:

1. In connection with an automobile, a horizontal bumper, situated higher than the headlights, supported by uprights that rise from a member of a low bumper.

2. In connection with an automobile an elevated horizontal bumper of flat steel springs supported by spring uprights and attached to an automobile bumper as shown herein.

WILLIAM A. CRAWFORD-FROST.